April 20, 1926. 1,581,489
E. T. McKAIG
SHOCK ABSORBER
Original Filed Oct. 8, 1920  2 Sheets-Sheet 1
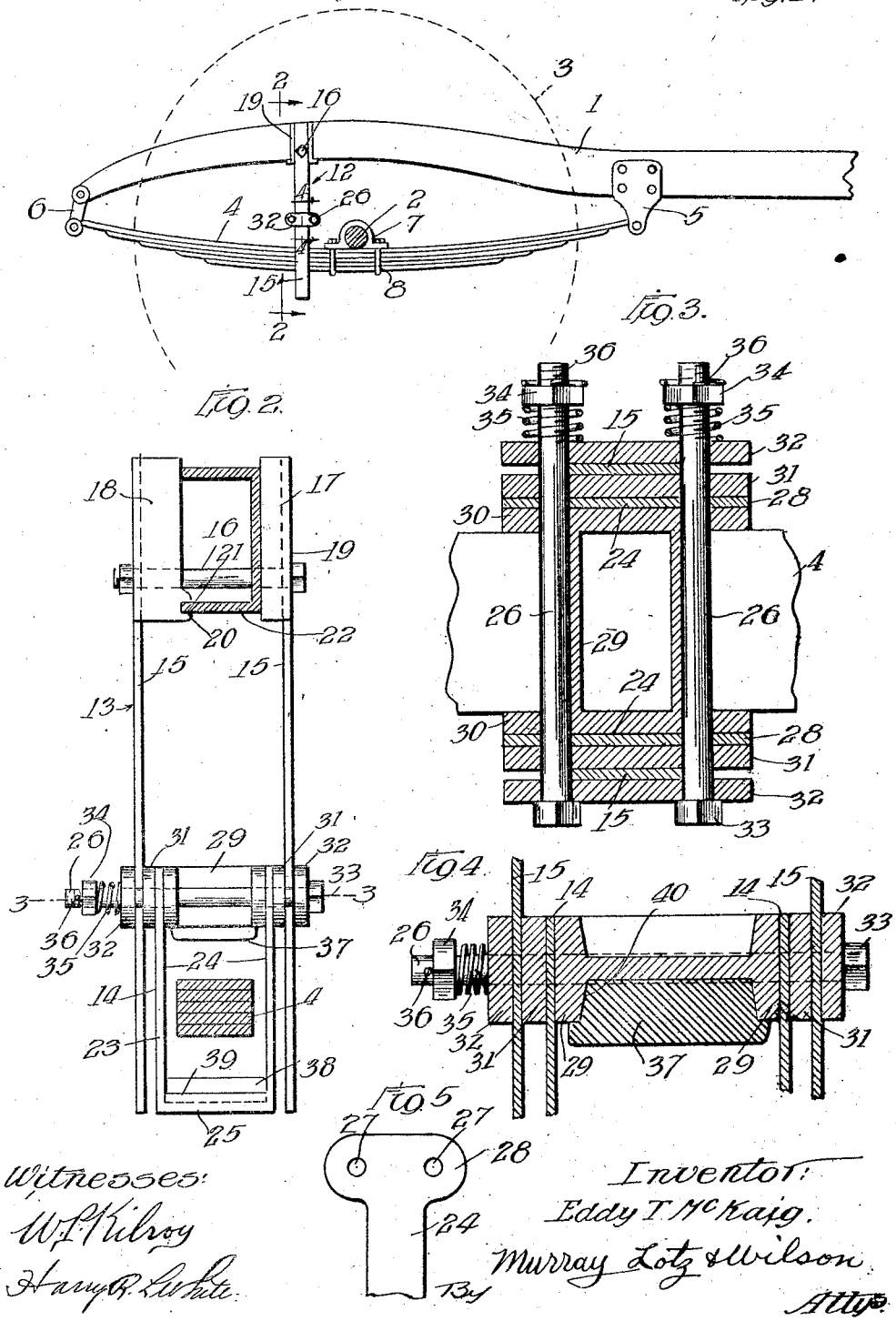
Witnesses:
W. F. Kilroy
Harry R. White
Inventor:
Eddy T. McKaig.
By Murray Lotz & Wilson
Attys.

April 20, 1926.
E. T. McKAIG
SHOCK ABSORBER
Original Filed Oct. 8, 1920   2 Sheets-Sheet 2
1,581,489
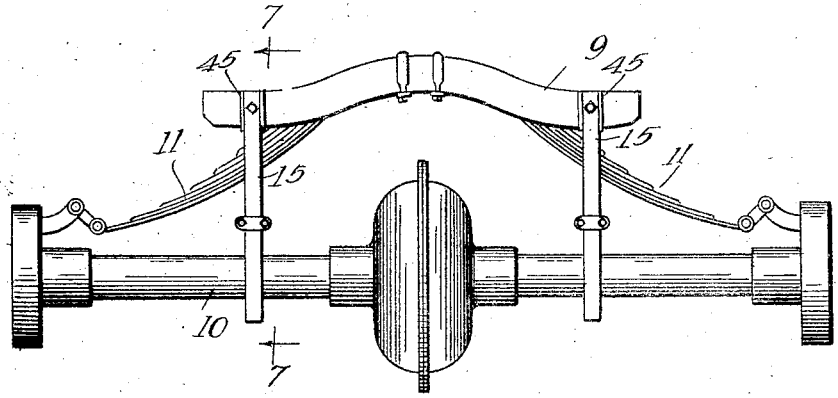
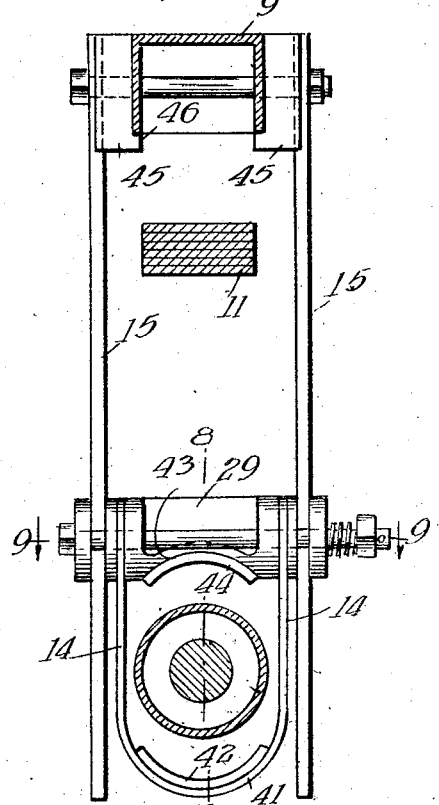
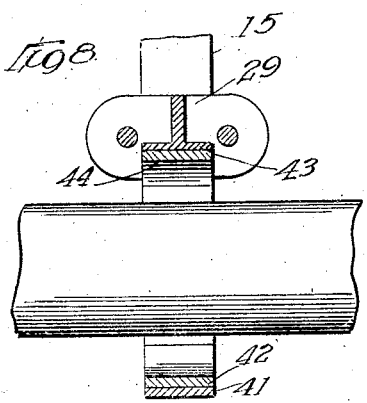
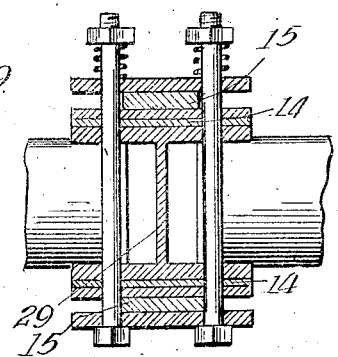
Witnesses
W. F. Kilroy
Harry P. L. White
Inventor
Eddy T. McKaig
By Murray Lotz & Wilson
Attys.

Patented Apr. 20, 1926.

1,581,489

UNITED STATES PATENT OFFICE.

EDDY T. McKAIG, OF CHICAGO, ILLINOIS.

SHOCK ABSORBER.

Application filed October 8, 1920, Serial No. 415,474. Renewed September 11, 1925.

*To all whom it may concern:*

Be it known that I, EDDY T. McKAIG, a citizen of the United States, and a resident of Chicago, in the county of Cook and State of Illinois, have invented certain new and useful Improvements in a Shock Absorber, of which the following is a specification.

My invention relates to improvements in shock absorbers for vehicles and has special reference to means for holding the body of an automobile from excessive movements in response to sudden up and down movements of the wheels.

The object of my invention is to provide a shock absorber of simple character which will effectively prevent or retard excessive or sudden relative movement between the body of a vehicle and a relatively movable spring resisted member, such as an axle or main spring; and which shall leave the main spring free to respond to light shocks without any hindrance from the shock absorbing device.

A further object of my invention is to provide a friction resisted shock absorber which will permit the body of a vehicle to set itself relatively to the load carrying element in accordance with the load on the body and in which set position the load carrying spring shall be free to respond to all slight shocks free of any restraint from the shock absorber, but which absorber shall be capable of resisting and absorbing any abnormal shocks and preventing the transmission thereof to the body of the automobile.

It is well understood that the main load carrying springs on vehicles, and especially on automobiles, are designed for certain predetermined deflections for certain specified loads; that within the capacity of the springs they are usually designed to properly support the load and to carry the load without undue oscillation under ordinarily fairly good road conditions.

So far as I am aware, shock absorbers, as heretofore applied to automobiles, resist the free movement of the springs under ordinary normal good road conditions, thus, to an extent at least, nullifying the careful work of the good spring designer and preventing the springs responding promptly to ordinary slight shocks.

My invention consists in a friction resisted member which is carried by one of two relatively movable parts such as a vehicle body and an axle, or a body spring, and adapted to engage the other of the two members. The friction resisted member is adapted to be automatically positioned relatively to the member to be engaged to permit the two members to move freely relatively to each other in response to normal or slight shocks resisted only by the load carrying spring, but to frictionally or yieldingly resist any abnormal relative movement of the two parts.

My invention will be more readily understood by reference to the acompanying drawings forming part of this specification, and in which:—

Figure 1 is a fragmentary side elevation of an automobile chassis showing the rear axle in section and indicatng the wheel by a dotted circle;

Figure 2 is a vertical section on the line 2—2 of Figure 1;

Figure 3 is a horizontal section on the line 3—3 of Figure 2;

Figure 4 is a vetrical section on the line 4—4 of Figure 1;

Figure 5 is a fragmentary side elevation of the upper end of the lower member of the shock absorber;

Figure 6 is an elevational view of a chassis illustrating another manner of applying my novel shock absorber;

Figure 7 is a vertical sectional view on the line 7—7 of Figure 6;

Figure 8 is a vertical sectional view on the line 8—8 of Figure 7; and

Figure 9 is a horizontal sectional view on the line 9—9 of Figure 7.

In said drawings, 1 represents an automobile chassis frame, the rear end portion being shown. The rear axle 2 is shown in section in its usual position below the frame, and adapted to carry the wheel 3 indicated by a dotted circle.

An ordinary half elliptical leaf spring 4 is shown connected at its forward end to the lower side of the frame 1 by a bracket 5 and connected at its rear end to the rear end of the frame 1 by the swinging link 6. The axle or its housing, as may be, is bolted to the spring by means of a bracket 7 and spring clip bolts or staples 8, as usual.

The frame 1 and the spring 4 in this instance constitute two members of the automobile chassis which are relatively movable, and which are connected together by the main load carrying spring of the automobile, the same being interposed between the road wheel 3 and the body carried by the frame 1.

Another arrangement of two such relatively movable members is shown in Figure 6, in which the rear cross bar 9 of the chassis frame is shown as the upper part and the rear axle housing 10 is shown as the lower relatively movable part, the spring 11 is interposed between the axle and frame. This latter construction is commonly known as the Ford rear axle construction.

Many means have been devised for the purpose of avoiding the disagreeable effect produced when sudden shocks to the wheels are transmitted to the occupants of the automobile.

It is well understood that if the wheel is forced upward suddenly, as when it strikes an obstruction, the first effect is to compress the spring 4, then the spring reacts to lift the load, with the result that the spring overlifts the load and immediately retracts again, causing most unpleasant results. The same unpleasant results follow if the wheel suddenly drops into a hollow and the results are greatly exaggerated, in a very rough road where the wheel first drops into a hollow and then almost immediately strikes the far side of the hollow and rises again.

It should be understood, of course, that the springs are originally designed to carry certain specified loads, the body being forced down more and more and the springs becoming stiffer and stiffer as the load is increased toward the maximum.

The many devices in use at the present time offer some detriment to the free action of the springs to ordinary shocks, and in consequence of this the spring is not free to respond, as it was originally designed to do.

By means of my invention I avoid any detrimental holding of the spring, leaving it free to respond as it is designed to under ordinary road travel, the shock absorbers coming into play to prevent the transmission of abnormal shocks to the body of the vehicle, the spring itself eliminating the smaller or lesser shock.

My shock absorber 12 comprises two members 13 and 14, one of which is rigidly secured to one of said relatively movable parts of the automobile, such as the frame 1 or the cross bar 9 and the other is arranged to engage the other movable part such as the spring 4 shown in Figure 1 or the axle housing shown in Figure 6.

The member 13, which is preferably rigidly secured to one of the relatively movable parts, comprises in each instance two parallel flat side bars 15 adapted to be secured at their upper ends to the frame of the chassis as by the bolt 16, the bars depending in vertical position from the frame. In order to properly spread the bars 15 apart, I usually provide fillers 17 and 18 arranged between the upper ends of the bars and the sides of the frame member to which they are bolted, each of which fillers have vertical side ledges 19 forming channels to receive the bars 15 and hold them rigidly in vertical position. The inner filler 18 is provided with a horizontal slot 20 at its lower edge to receive the inner edge 21 of the lower flange of the frame to hold the filler against rotating on the bolt and hold the device in vertical position. These bars 15 are spread apart to straddle the spring 4 and to leave ample room between the spring and the side bars 15 for the member 14, and they extend down far enough to allow for the extreme downward throw of the spring under the frictionally controlled condition maintained by the device.

The member 14 comprises a U-shaped member 23 having side arms 24 arranged within and parallel to the bars 15 of the member 13. The cross bar 25 of the U-shaped member connects the lower ends of the sides 24 and the upper ends are bound together and are frictionally held to the bars 15 by bolts 26 which straddle the two bars 15 and pass through holes 27 formed in lateral enlargements 28 on the upper ends of the side bars 24. The side bars 24 are spaced apart to receive the spring 4 between them and leave ample clearance on each side of the spring. To rigidly brace the side bars 24 apart at their upper ends, I provide a light strut or filler casting 29 having flat side flanges 30 corresponding in size and shape to the upper ends of the side bars 24 and provided with holes to receive the bolts 26. The member 14 is enough narrower than the spacing of the bars 15 to allow room for a flat frictional member 31 at each side between the inner bars 24 and the outer bars 15 and I clamp the outer bars against these frictional members 31 by interposing similar frictional members 32 between the heads 33 of the bolts 26 and the bars 15 on one side and between the nuts 34 of the bolts and the bars 15 at the other side. To prevent an inadvertent solid clamping of the two members by the bolts, I provide rather stiff compression springs 35 between the nuts 34 and the friction plate 32 so that they are frictionally held together with a yielding pressure. To guard against the nuts 34 working off and being lost, I usually provide cotters 36 in the outer ends of the bolts.

The member 14 is long enough vertically to provide space above and below the spring 4 to permit the spring 4 to respond freely to ordinary road shocks, as shown in Figure 2, where the parts are shown in what may be termed a normal loaded condition. If a greater load is added the frame will be forced down toward the spring and when the automobile has progressed but a short distance on the road the vibration of the spring up and down will move the member 14 up to correspond with its new normal position so that the spring, under this greater load, will still occupy a position substantially midway between the filler casting 29 at the upper end and the cross bar 25 at the lower end.

I preferably provide a rubber or similar bumper 37 on the filler casting 29 and similar bumper 38 on the cross bars 25 to cushion the contact and avoid any metallic noise when the spring comes in contact with these parts. These bumpers are renewable, being held in position by any suitable means such as ledges 39 on the cross bars 25 or by being inserted into a pocket 40 in the filler member 29, and by the use of any suitable cement or other means.

It will now be clear that under ordinary good road conditions the spring is free to play up and down in response to any slight shock to the wheels and in accordance to the load to which they are subjected, and that when the spring is subjected to any abnormal deflection due to the sudden upward or downward movement of the wheel or axle, the wheel will rise or fall as needs may be, into contact with the member 14 and will tend to slide said member on the side bars 15, being hindered in the free movement of the member 14 by the frictional engagement of the bars 15. That consequently the abnormal deflection is prevented and likewise the usual rebound of the spring will be absorbed; and the occupants of the automobile can ride at ease, even upon a very rough road.

In the application of my device as illustrated in Figures 6 to 9 inclusive, I have shown the lower member of the device formed to engage a cylindrical axle housing 10. The U-shaped lower end member is formed with a curved cross bar 31 upon which the curved pad 42 is secured, and the filler member 29 is formed with a curved under surface 43 to which the pad 44 is secured. Otherwise the construction of the member 14 is the same as that already described. The side bars 15 of the upper member straddle the spring 11 and are bolted to the cross bar 9 of the frame, similar to the securing of these bars as shown in Figure 1, the only difference being that the filler blocks 45 at the upper ends of the bars 15 are formed to conform with the shape of the cross bar 9, which is shown as of channel form with its open side facing down. These filler blocks 45 each have an inner ledge 46 at its lower side to project beneath the bar 9 and hold the blocks and the device rigidly in vertical position. The operation of the device shown in Figure 6 is similar to that shown in Figure 1, the only difference being that the lower member 14 engages the axle housing in the latter case and in the former is adapted to engage the spring, but in both forms the abnormal shocks are absorbed in the same manner and the springs in both forms are free to respond to ordinary slight shocks without hindrance from the shock absorber.

As many modifications of my invention will readily suggest themselves to one skilled in the art, I do not limit or confine my invention to the specific structures herein shown and described.

I claim:

1. In a shock absorber for vehicles, two relatively movable parts, friction means resisting free relative movement of said parts, one part adapted to be rigidly secured to one of two relatively movable members of a vehicle which are connected by a load carrying spring, the other part adapted for engagement with the other relatively movable member of the vehicle, the second part having an opening for receiving said other movable member, which opening permits a limited free movement of the two members of the vehicle in both directions, the said second part being capable of being set by said other movable member to place said other member substantially in the middle of said opening in accordance with the load on the vehicle.

2. In an automobile, the combination with the chassis, a wheel axle and an interposed spring, of a shock absorber comprising a member adapted to be rigidly secured to the chassis, and a second member for engagement with a relatively movable part of the automobile, frictional means for resisting free relative movement of the two members, the second member being in looped form for surrounding the movable part, the loop permitting free relative movement of the movable part from and toward the other part to a limited extent and frictionally resisting any abnormal relative movement thereof in both directions.

3. In a shock absorber for automobiles, comprising a device adapted to be interposed between two relatively movable parts of the automobile, the device consisting of two members, one thereof having an opening for receiving one of the relatively movable parts, the opening being of a size to permit a limited free relative movement of said parts, the other member being adapted to be rigidly mounted on the other part, the first member having side slots for receiving the other member, bolts passing through both of said members for clamping them together, friction washers on the bolts adapted to resist relative movement of the two members, and yielding pads at the ends of said opening for contact with the surrounded member.

Signed at Chicago, Illinois, this 2nd day of October, 1920.

EDDY T. McKAIG.